P. H. BAILLY.
TRANSMISSION GEARING.
APPLICATION FILED JULY 10, 1919.
1,410,445.
Patented Mar. 21, 1922.
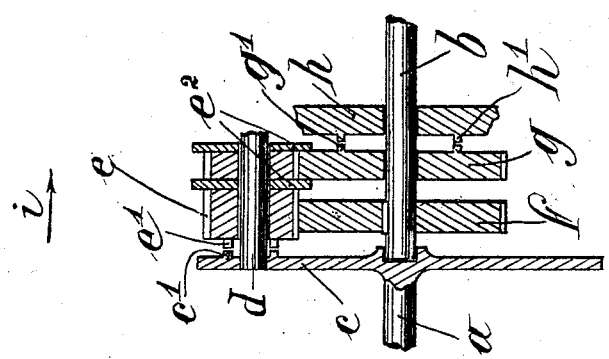
Witnesses:
Norris L. Sumby.
Inventor
Philippe Henri Bailly
by
Attorney

UNITED STATES PATENT OFFICE.

PHILIPPE HENRI BAILLY, OF PARIS, FRANCE.

TRANSMISSION GEARING.

1,410,445.    Specification of Letters Patent.    Patented Mar. 21, 1922.

Application filed July 10, 1919. Serial No. 309,812.

*To all whom it may concern:*

Be it known that I, PHILIPPE HENRI BAILLY, a citizen of the French Republic, residing in Paris, France, have invented certain new and useful Improvements in Transmission Gearing, of which the following is a specification.

The invention relates to mechanisms to be inserted between a driving shaft and a driven shaft for the purpose of modifying the relative speed of rotation of the said shafts when the driving shaft changes the direction of its rotation or becomes the driven shaft; and it relates more particularly, though not exclusively, to gearing adapted to be inserted between the crank shaft of an explosion engine and an electric machine capable of being used as a lighting dynamo as well as a starting motor.

The primary object of the invention is to provide a mechanism which shall be simple in construction and reliable in operation.

Other objects of the invention consisting of novel constructions and arrangements of parts will become apparent as the description proceeds.

The accompanying drawing illustrates the preferred form of my invention but it will be understood that the invention may be embodied in other forms than that herein shown and described without departing from the spirit and scope of the invention as set forth in the claims.

The single figure of the drawing shows in longitudinal section and somewhat diagrammatically a mechanism constructed in accordance with my invention.

In this description it is assumed that it is desired to start an internal combustion engine by means of a motor which may be subsequently driven by the engine and act as an electric generator.

In utilizing the electric machine as a generator it is desirable to rotate the same at a speed proximating that of the explosive engine, while for starting the engine, it is advisable to turn the crank shaft of the engine at a much slower rate than the speed of the starter shaft.

It is therefore advisable to have a coupling ensuring, preferably automatically, that when the shaft of the explosion engine is the driving shaft, it should drive the shaft of the electric machine directly, and that, when the shaft of the explosion engine is the driven shaft, it should be connected to the shaft of the electric machine by a speed reducing gear.

To that end, and according to the invention, the shaft $a$ of the electric machine is arranged in line with the shaft $b$ of the explosion engine.

To one end of the shaft $a$ is keyed a disc $c$ to which is secured, at a certain distance from the shaft $a$ and parallel to the latter, a spindle $d$ on which the toothed pinion $e$ is loosely mounted.

To the shaft $b$ is keyed a toothed wheel $f$ in such a manner that it meshes with the pinion $e$. On the said shaft $a$ is also mounted, but loosely, a toothed wheel $g$ of the same diameter as the wheel $f$ and having nearly the same number of teeth as the said wheel and the said wheel $g$ is arranged so that it also meshes with the pinion $e$.

It will be understood that under these conditions, if by any means the pinion $e$ is prevented from rotating about its spindle $d$, there will be obtained a direct drive between the shaft $a$ and the shaft $b$; but if by any desired means, the wheel $g$ is prevented from turning, the shaft $a$, in rotating, will force the pinion $e$ to roll on the fixed wheel $g$, but as the said pinion simultaneously engages with the wheel $f$ which has a different number of teeth, it will force the wheel $f$, and consequently the engine shaft $b$, to rotate to a small extent (which extent will be $1/nth$ revolution per revolution of the shaft $a$ if the number of teeth of the wheel $g$ were $n$ and that of the wheel $f$, $(n-1)$.

The pinion $e$ may be locked on the spindle $d$, by mounting it so that it is capable of sliding longitudinally on the said spindle and by providing it with clutch teeth or claws $e'$ capable of engaging with corresponding teeth $c'$ secured to the disc $c$. And in the same way, the wheel $g$ may be locked from rotation by mounting it on the shaft $b$ so that it may slide longitudinally on the said shaft, and by providing it with claws $g'$ capable of engaging with claws $h'$ secured to the stationary frame $h$ of the apparatus.

In order to obtain automatically such a longitudinal movement of the pinion $e$ and of the wheel $g$, the pinion $e$ and the wheel $f$ are provided with teeth inclined in such a manner as to tend to force the pinion $e$ laterally when the shaft $a$ is the driving shaft, and during this lateral motion of the pinion $e$, to the right as shown in the figure, the flanges $e^2$ secured to the said pinion and embracing the gear wheel $g$, impart corresponding lateral motion to the gear $g$ until the clutch teeth $g'$ of the latter engage the clutch teeth $h'$. On the other hand, when the shaft $b$ is the driving shaft, the teeth $e'$ will be forced into engagement with the corresponding clutch teeth $c'$ by the lateral motion of the pinion $e$ in the opposite direction, that is to the left as shown in the figure, and during this lateral motion, the flanges $e^2$ will move the gear wheel $g$ laterally so as to disengage the clutch teeth $g' h'$.

In this way, when the shaft $a$ is the driving shaft, the pinion $e$ is pushed in the direction of the arrow $i$, and the wheel $g$ is locked owing to its claws $g'$ engaging with the claws $h'$; and when the shaft $b$ is the driving shaft, the pinion $e$ is pushed in the opposite direction, and is locked on its spindle $d$ owing to its claws $e'$ engaging with the claws $c'$ of the disc $c$.

It will be understood that the parts of the pinion $e$ meshing with gears $f$ and $g$ may have a different number of teeth and be of different diameters, the diameters and number of teeth in the gear wheels $f$ and $g$ may also be varied, and other modifications may be made without departing from the spirit and scope of the invention as expressed in the appended claims.

What I claim as my invention and desire to secure by Letters Patent is:—

1. In transmission mechanism, the combination of a shaft having a disk rigidly secured thereto, a second shaft in axial alignment with said shaft having a gear wheel fixed thereto and a gear wheel loosely mounted thereon, said gear wheels having an unequal number of teeth, a spindle carried by said disk, a pinion loosely mounted on said spindle and meshing with both of said gear wheels, means for holding said loosely mounted gear stationary when the shaft having the disk is the driver and means for operatively engaging said pinion and disk when the second shaft is the driver.

2. In transmission mechanism, the combination of a shaft having a disk rigidly secured thereto, a second shaft in axial alignment with said shaft having a gear wheel fixed thereto and a gear wheel loosely mounted thereon, said gear wheels having an unequal number of teeth, a spindle carried by said disk, a pinion loosely mounted on said spindle and meshing with both of said gear wheels, a stationary frame member adjacent said loosely mounted gear wheel, clutch members having co-acting cam surfaces on said pinion and disk and on said loosely mounted gear and stationary member, and means for preventing relative lateral displacement of said pinion and loosely mounted gear, whereby when said first named shaft is the driver the clutch between the loosely mounted gear and stationary member will function to hold said gear stationary and when said second shaft is the driver said pinion will be automatically moved laterally until the clutch between the pinion and disk is in operative engagement.

3. In transmission mechanism, the combination of a shaft having a spindle in spaced relation and rigidly connected thereto, a second shaft, and means for driving the second shaft from the first at reduced speed or the first shaft from the second at a speed approximating the speed of rotation of said second shaft, said means including a pinion slidably mounted on said spindle adapted to rotate thereon when the first shaft is the driver and to revolve with said disk when the second shaft is the driver.

4. In starting and lighting mechanism for internal combustion engines, gearing adapted to be placed between the starter and engine shafts including a gear wheel fixed to and a gear wheel loosely mounted upon the engine shaft, said gear wheels having an unequal number of teeth, and a pinion meshing with both of said gear wheels, and means for locking said loosely mounted gear wheel from rotation in starting the engine.

In testimony whereof I have signed my name to this specification in the presence of two subscribing witnesses.

PHILIPPE HENRI BAILLY.

Witnesses:
 EUGÈNE PELLIC,
 JOHN F. SIMONS.